US012365189B2

(12) United States Patent
Wouters et al.

(10) Patent No.: US 12,365,189 B2
(45) Date of Patent: Jul. 22, 2025

(54) INKJET PRINTING METHOD

(71) Applicant: AGFA NV, Mortsel (BE)

(72) Inventors: Paul Wouters, Mortsel (BE); Martin De Kegelaer, Mortsel (BE)

(73) Assignee: Agfa NV, Mortsel (BE)

( * ) Notice: Subject to any disclaimer, the term of this patent is extended or adjusted under 35 U.S.C. 154(b) by 279 days.

(21) Appl. No.: 18/010,846

(22) PCT Filed: Jun. 8, 2021

(86) PCT No.: PCT/EP2021/065213
§ 371 (c)(1),
(2) Date: Dec. 16, 2022

(87) PCT Pub. No.: WO2021/254813
PCT Pub. Date: Dec. 23, 2021

(65) Prior Publication Data

US 2023/0226827 A1 Jul. 20, 2023

(30) Foreign Application Priority Data

Jun. 19, 2020 (EP) .................................... 20180999

(51) Int. Cl.
*B41J 11/00* (2006.01)
*B41J 15/04* (2006.01)

(52) U.S. Cl.
CPC ........ *B41J 11/0005* (2013.01); *B41J 11/0085* (2013.01); *B41J 15/048* (2013.01)

(58) Field of Classification Search
CPC .. B41J 11/0005; B41J 11/0085; B41J 15/048; B41J 15/04; B41J 2/01
See application file for complete search history.

(56) References Cited

U.S. PATENT DOCUMENTS 8,177,355 B2 5/2012 Toya
8,967,075 B2 3/2015 Miyamoto et al.
(Continued)

FOREIGN PATENT DOCUMENTS

CN 101870204 A 10/2010
CN 101941307 A 1/2011
(Continued)

OTHER PUBLICATIONS

European Patent Office, International Search Report in International Patent Application No. PCT/EP2021/065213, mailed Aug. 25, 2021, 4 pp.

(Continued)

*Primary Examiner* — Thinh H Nguyen
(74) *Attorney, Agent, or Firm* — Leydig, Voit & Mayer, Ltd.

(57) ABSTRACT

An inkjet printing method on a continuous substrate web (100), having a pair of edges (1011, 1021), comprising the steps: a) forming a pair of elongated strips (101, 102) by bending said substrate web 1021 (100) along a pair of lines (1010, 1020) wherein each line is parallel to the pair of edges (1011, 1021); and b) supporting said bent substrate web 1011 201 in a support zone (201) of a printer (200) wherein said pair of elongated strips (101, 102) are oriented towards said zone (201); and printing an image (500) on said supported substrate web by an inkjet-printhead (202) of said printer (200).

19 Claims, 9 Drawing Sheets

(56) References Cited

U.S. PATENT DOCUMENTS

| | | | | |
|---|---|---|---|---|
| 9,682,573 | B2 | 6/2017 | Leighton | |
| 2010/0038265 | A1 | 2/2010 | Geoffroy et al. | |
| 2011/0104391 | A1 | 5/2011 | Miyamoto et al. | |
| 2014/0253630 | A1* | 9/2014 | Kakigahara ................ | B41J 2/01 347/20 |

FOREIGN PATENT DOCUMENTS

| | | | |
|---|---|---|---|
| CN | 105636795 | A | 6/2016 |
| WO | WO 2015/058865 | A1 | 4/2015 |
| WO | WO 2017/036943 | A1 | 3/2017 |

OTHER PUBLICATIONS

European Patent Office, Written Opinion in International Patent Application No. PCT/EP2021/065213, mailed Aug. 25, 2021, 5 pp.

* cited by examiner

INKJET PRINTING METHOD

CROSS-REFERENCE TO RELATED APPLICATIONS

This patent application is the U.S. national phase of copending International Patent Application No. PCT/EP2021/065213, filed Jun. 8, 2021, which claims the benefit of European Patent Application No. 20180999.3, filed Jun. 19, 2020.

TECHNICAL FIELD

The present invention is an inkjet printing method on a continuous substrate web, especially light-weight continuous substrate web, having edge-waviness.

BACKGROUND ART

Inkjet printing methods on continuous substrate web (100) are already explored for several decennia not only by multi pass printing but also by single pass printing wherein the continuous substrate web (100) is transported by web-fed roll-to-roll process or web-fed roll-to-sheet process. Said substrate web (100) is transported by unwinding a roll of said substrate web (100), the so-called input roll (111), before it is supported in a support zone (201) of the printer. After printing, the substrate web may be cut into sheets or may be rewinded on another roll, the so-called output roll (112). Continuous substrate web is typically light-weight material which can be winded on a roll for printing. It can be bend easily around a core. The printer has means for supporting said input roll (111) and optionally said output roll (112) and is configured for transporting the substrate web (100) underneath the inkjet-printhead (202).

Said methods tried to solve known issues when using inkjet print technology on a continuous substrate web (100) which cause inferior print quality:

- irregular transport speed of said substrate web (100);
- web swim of said substrate web (100);
- stretch or shrink of said substrate web (100) while printing; drying and/or transporting due to changing of internal forces in said substrate web (100).

Examples of said methods are applied in the following printers:

- Agfa Dotrix Modular by manufacturer AGFA NV;
- KBA Rotajet by manufacturer Koenig & Bauer AG;
- Rho 312R Plus/LED by manufacturer Durst Phototechnik AG;
- Gallus Labelfire 340 by manufacturer Heidelberg Druckmaschinen Aktiengesellschaft.

Another issue is the non-flatness at the edges (1011, 1021) of a continuous substrate web (100) while transporting said substrate web (100) underneath an inkjet-printhead (202) of a printer (200). Said non-flatness occur after unwinding the substrate web (100) and transporting towards the support zone (201) and is the result of a previously rewinding of the input roll (111), previously cutting a big roll in smaller rolls, storage-conditions of the input roll (111), internal forces in the substrate web (100) that changes after unwinding; lower internal forces at the edges than in the middle of the substrate; humidity of the input roll (111) and/or humidity at the printing room. Said non-flatness is sometimes called edge waviness.

U.S. Pat. No. 9,682,573 BB (XEROX CORPORATION) discloses a method wherein said non-flatness at the edges (1011, 1021) is first calendered before printing for having a total flat substrate web. It is found that this is not feasible for any type of material of the substrate web.

Said non-flatness may cause also that the holding down of the substrate web (100) against the support zone (201) of the printer (200) is not optimal, which may result in crashes of the substrate web (100) against an inkjet-printhead (202) of the printer (200) and creating wrinkles in said substrate web (100) during its transport through the printer (200).

SUMMARY OF INVENTION

It is an object of the present invention to provide a solution for an excellent holding down of a substrate web (100), having edge-waviness, so no wrinkles in said substrate web (100) can occur during the transport underneath an inkjet-printhead (202) of the printer.

This object has been realised with the inkjet printing method as defined in claim 1.

Further objects of the invention will become apparent from the description hereinafter.

BRIEF DESCRIPTION OF DRAWINGS

FIGS. 8 and 9 show also a substrate web (100) which is bended by the edge-bender unit (203). Said bending is illustrated by the black small arrow. At the other edge of the substrate web (100) there is a similar edge-bender unit (204) in the printer (200). It is a mirrored version. Said mirrored version is not shown in said images.

FIG. 11 is an unassembled edge bender unit.

DESCRIPTION OF EMBODIMENTS

Figure 1:
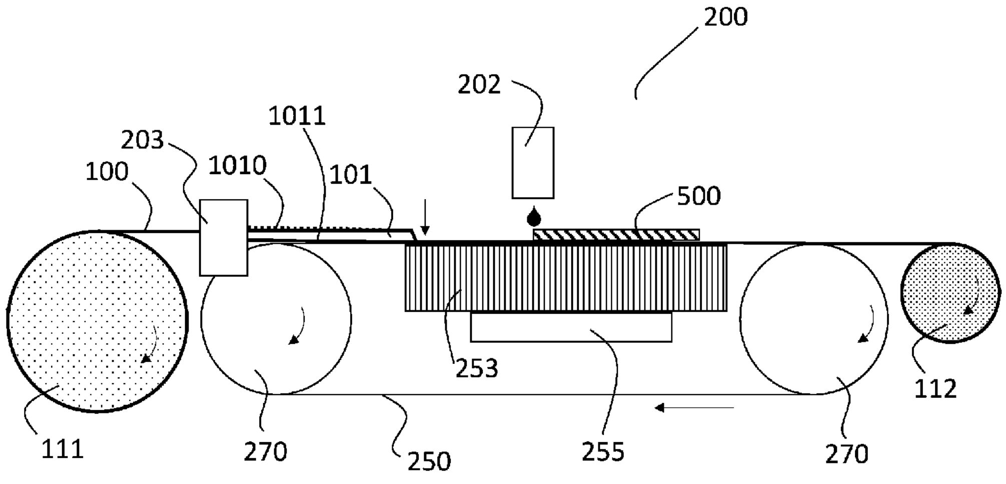
FIGS. 1 to 5 are cross-sections of an inkjet printer (200) of preferred embodiments with at the left-side the entrance of substrate web (100) from an input roll (111).

The present invention is an inkjet printing method on a continuous substrate web (100), having a pair of edges (1011, 1021), comprising the steps:

a) forming a pair of elongated strips (101, 102) by bending said substrate web (100) along a pair of lines (1010, 1020) wherein each line is parallel to the pair of edges (1011, 1021); and b) supporting said bent substrate web in a support zone (201) of a printer (200) wherein said pair of elongated strips (101, 102) are oriented towards said zone (201); and printing an image (500) on said supported substrate web by an inkjet-printhead (202) of said printer (200). So instead of flattening the pair of edges (1011, 1021) before printing as known in the state-of-the-art, the pair of edges are bend before printing.

Figure 6:
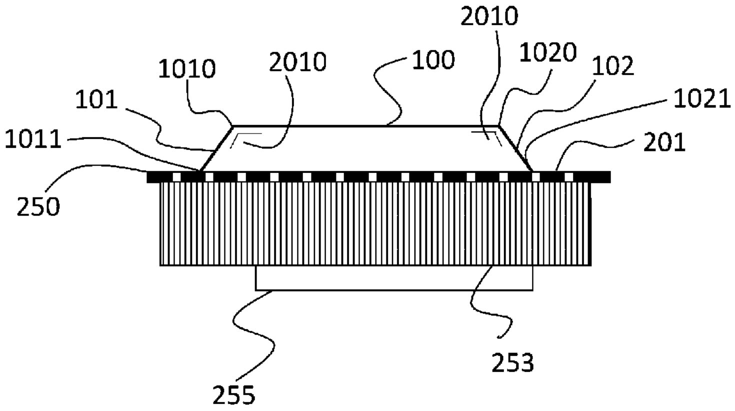
FIG. 6 is a cross-section of a preferred printer (200) which illustrates how a bend substrate web (100) is applied on the support zone (201).
Figure 7:
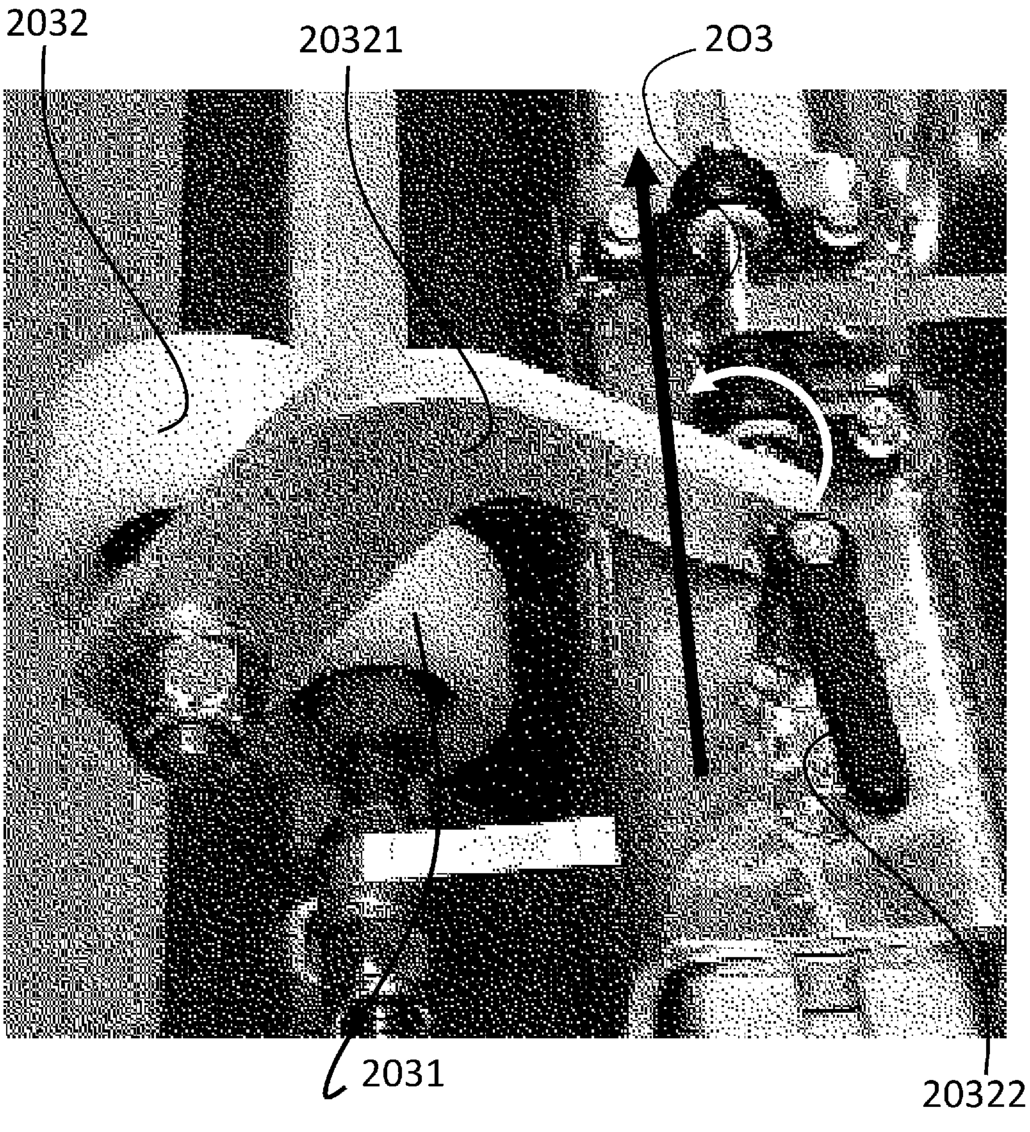
FIGS. 7 to 9 are halftoned images of a preferred edge-bender unit (203).
Figure 8:
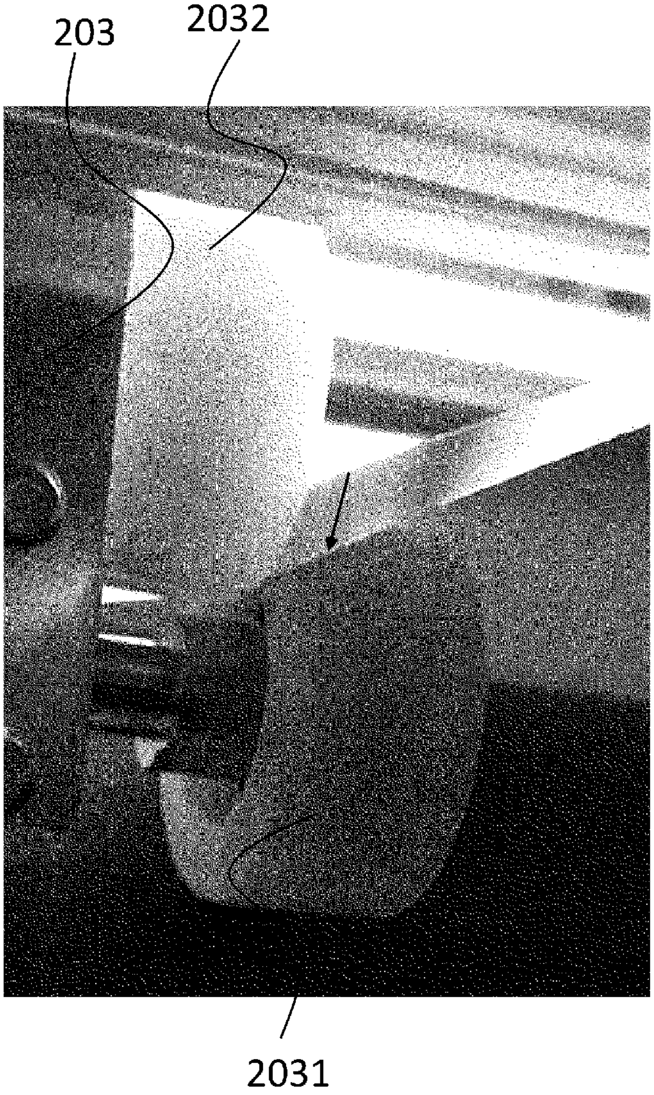
Figure 9:
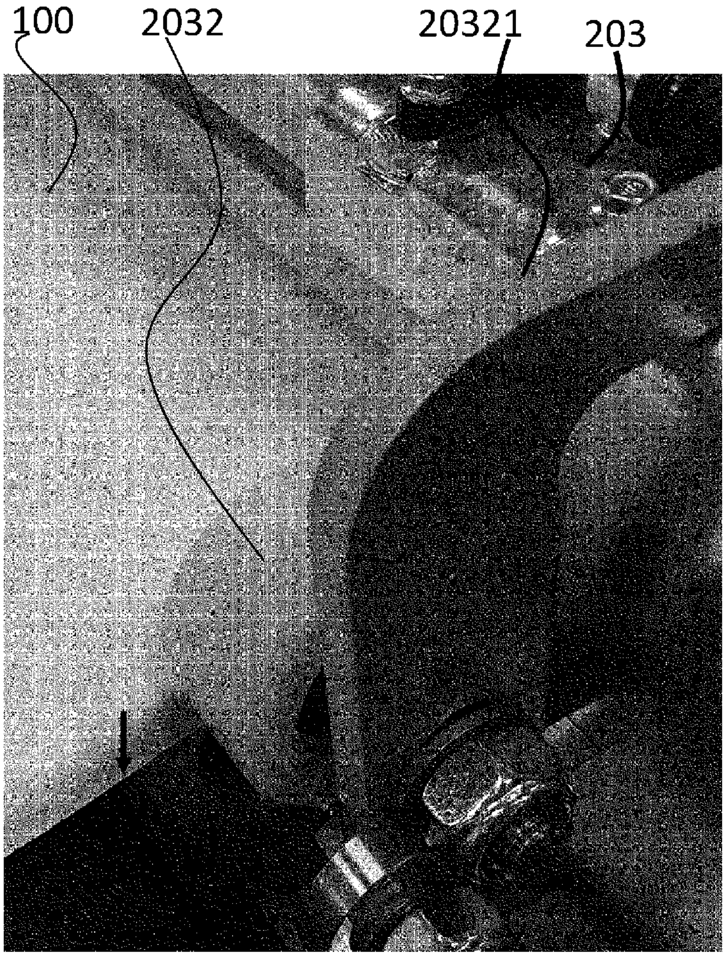
Figure 10:
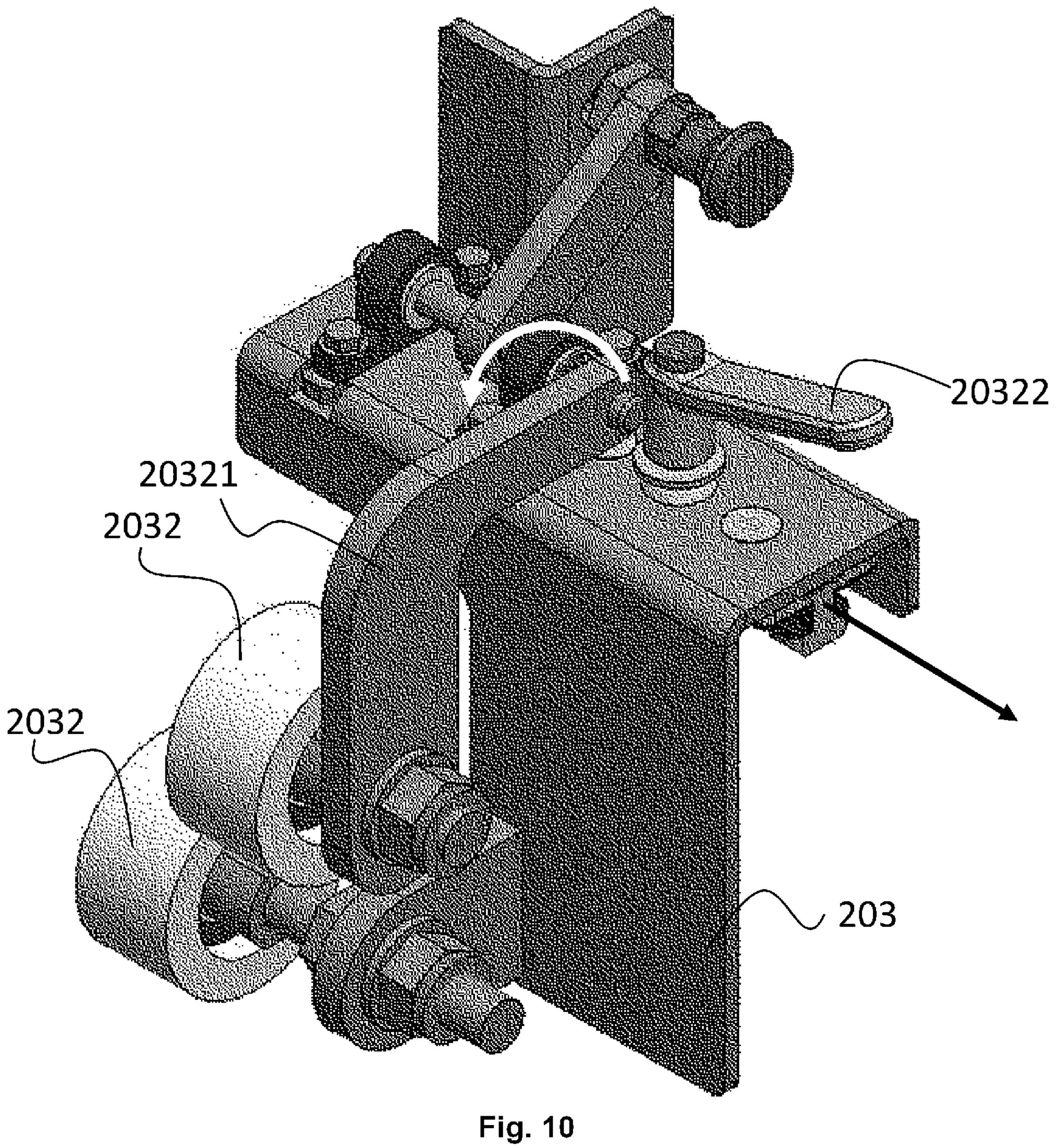
FIGS. 10 and 11 illustrate the edge-bender unit of FIGS. 7 to 9.
Figure 11:
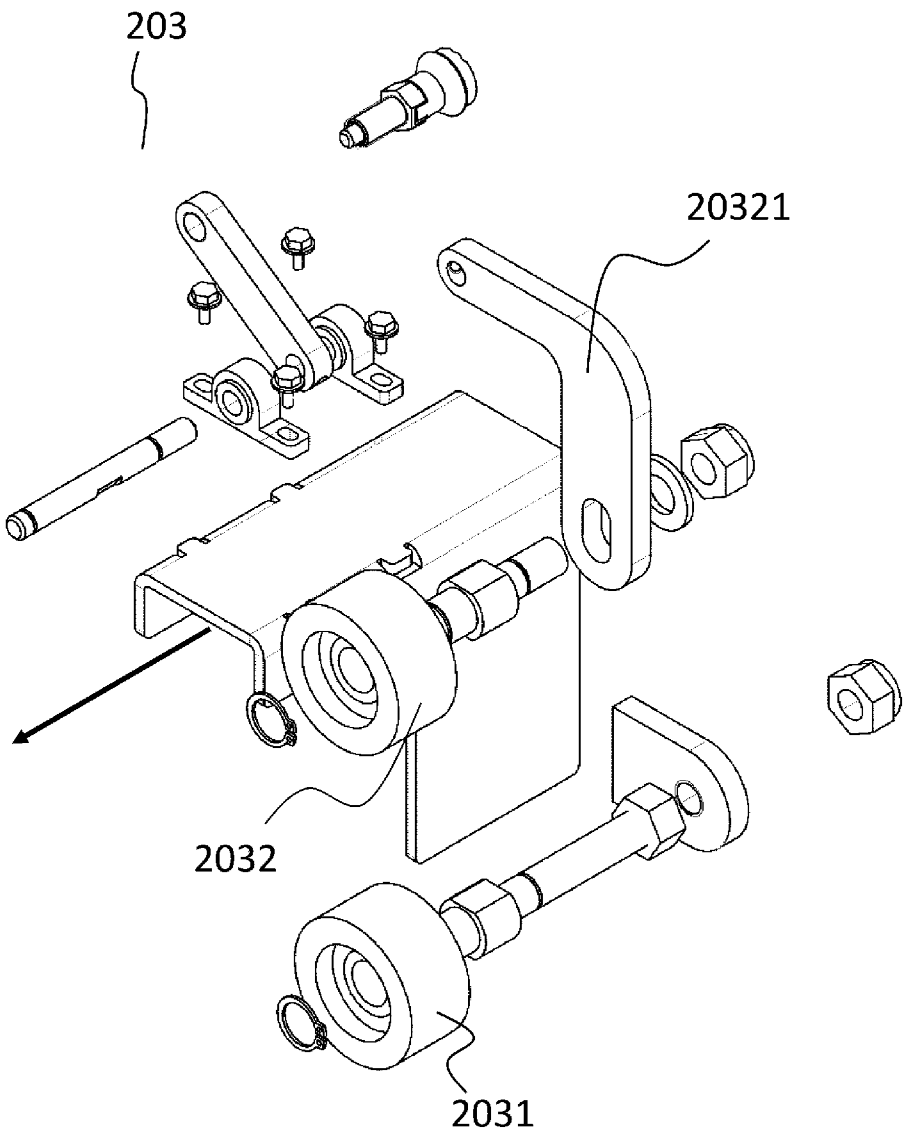

As shown in FIG. 6 the substrate web (100) is applied on the support zone (201), here located on a vacuum belt (250) wherein a vacuum table (253) is used to provide vacuum power in said support zone (201) via a vacuum chamber (255). Before the application on said support zone (201), the edges (1011, 1021) are bended towards said support zone (201) so they form elongated strips (101, 102) along a line (1010, 1020), with a determined bending angle (2010). Said lines are also called bending lines.

The elongated strips (101, 102) are preferably not oriented underneath the substrate web (100) between said strips (101, 102) when the substrate web (100) is supported. This can be done by bending the substrate web (100) with a bending angle (2010) larger than 90 degrees. Thus the bending is not folding which results then in a bending angle of 0 degrees.

The elongated strips (101, 102) are applied by bending the substrate web (100), each by an edge bender unit (203, 204) and they are further oriented towards the support zone (201). Hereby the substrate web is positioned more stable on said zone (201). The pair of lines (1010, 1020) formed after the step a) gives a higher stiffness in said substrate web and the elongated strips (101, 102) behave like a pair of flanges whereon the substrate web between said flanges is supported.

The material of the substrate web (100) should of course be pliable which is mainly so for light-weight substrate web which has a weight below 150 g/m$^2$ more preferably below 120 g/m$^2$ and above 10 g/m$^2$. If the material of said substrate web comprises fibers, such as cellulose fibers, the pair of lines (1010, 1020) are preferably substantially parallel to the orientation of said fibers for easy bending and for avoiding that the fibers break. The substrate web (100) may of course also be a polymeric substrate.

The material of the substrate web (100) between the elongated strips (101, 102) preferably hangs towards the support zone (201) whereby more preferably the middle of the substrate web between said strips (101, 102) is connected to the support zone (201). The width of the substrate web is hereby preferably more than 1 m. Said width is measured as shortest distance between the pair of edges (1011, 1021).

Preferably the smallest angle between the support zone (201) and each elongated strip of the pair of elongated strips (101, 102) is below 80 degrees when the continuous substrate web (100) is supported in said zone (201). Said smallest angle is more preferably between 0.1 and 70 degrees and most preferably between 2 and 65 degrees. Said degree depends on the material of the substrate web (100) and how large the stiffness is caused by said down oriented elongated strips (101, 102) on the support zone (201).

In a preferred embodiment the width of each elongated strip of the pair of elongated strips (101, 102) is below 10 cm. Said width is more preferably between 1 mm and 70 mm and most preferably between 2 mm and 40 mm. Said width is selected by the operator of the printer (200) but it is mainly chosen depending material of the substrate web (100) and/or how large the stiffness is caused by said down oriented elongated strips (101, 102) on the support zone (201). Said width is the shortest distance between the line (1010, 1020) of the elongated strip (101, 102) and the edge (1011, 1021) is part of said elongated strip (101, 102).

Figure 12:
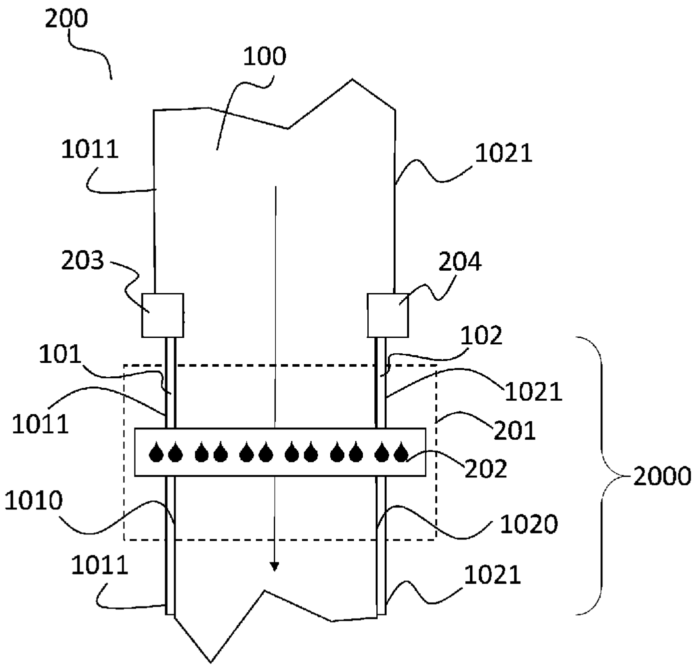
FIGS. 12 and 13 illustrate how the substrate web (100) is bended in a top-view of a preferred printer (200) namely a single pass inkjet-printer with an elongated inkjet-printhead (202) positioned over the substrate web (100).
Figure 13:
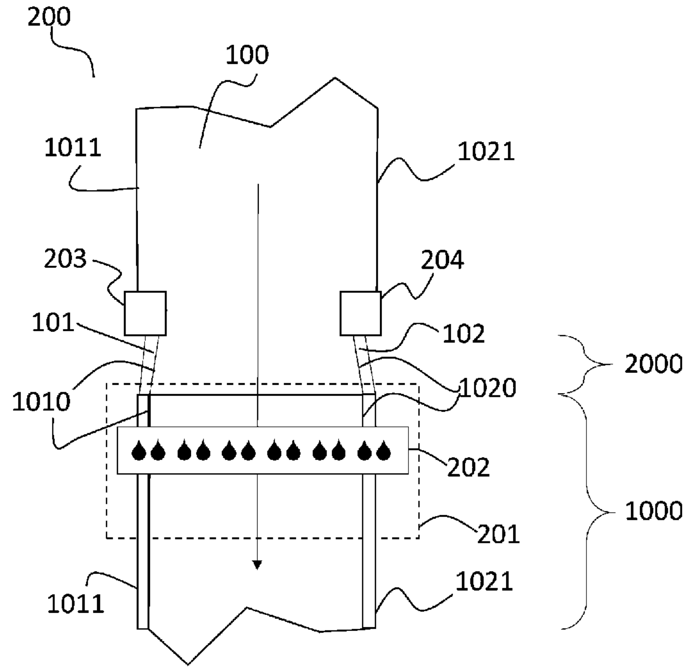

In a preferred embodiment the inkjet printing method is a single pass inkjet printing method (FIG. 12, FIG. 13).

Figure 14:
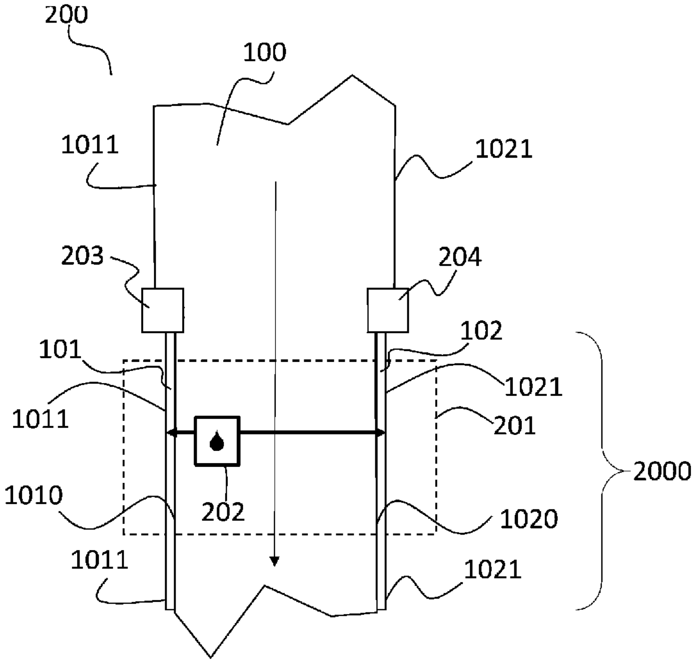
FIGS. 14 and 15 illustrate how the substrate web (100) is bended in a top-view of a preferred printer (200) namely a multi pass inkjet-printer with an inkjet-printhead (202) positioned over the substrate web (100) which is configured to move across the substrate web (100).
Figure 15:
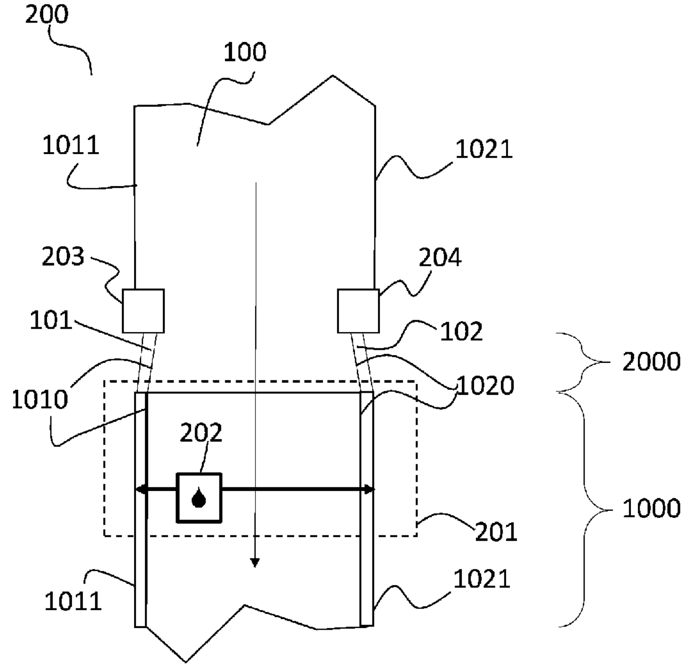

FIG. 12 and FIG. 14 illustrate the bending of the edges (1011, 1021) of the substrate web (100) as a preferred embodiment of the disclosure wherein the edges (1011, 1020) remains bended (2000) by the edge bender units (203, 204) and hereby forming a line (1010, 1020) and elongated strips (101, 102) while printing and they (101, 102) may flattened after printing or may be flattened before printing (1000) as illustrated in FIG. 13 and FIG. 15.

Polymeric Substrate

Any polymeric substrate having a maximum value for Tan δ between 40° C. and 110° C. is suitable as web-like polymeric substrate for use in the present invention. Polyethylene is the most preferred polymeric substrate for use as web-like polymeric substrate in the present invention.

Polyethylene is produced in various low and high densities. These are well-known to a skilled person in manufacturing polyethylene films and foils by their abbreviations, such as UHMWPE, HDPE, PEX, MDPE, LLDPE, LDPE and VLDPE. The latter three are most commonly used for making plastic bags.

LLDPE is defined by a density between 0.915 and 0.925 g/cm3 and is a substantially linear polymer, with significant numbers of short branches, commonly made by copolymerization of ethylene with short-chain alpha-olefins (e.g. 1-butene, 1-hexene, and 1-octene). LLDPE has higher tensile strength than LDPE and exhibits higher impact and puncture resistance than LDPE.

LDPE is defined by a density between 0.910 and 0.940 g/cm$^3$. LDPE has a high degree of short and long chain branching, which means that the chains do not pack into the crystal structure as well. It has therefore less strong intermolecular forces as the instantaneous-dipole induced-dipole attraction is less. This results in a lower tensile strength and increased ductility. LDPE is created by free radical polymerization. The high degree of branches with long chains gives molten LDPE unique and desirable flow properties.

VLDPE is defined by a density between 0.880 and 0.915 g/cm3 and is a substantially linear polymer, with high levels of short chain branches, commonly made by copolymerization of ethylene with short-chain alpha-olefins (e.g. 1-butene, 1-hexene, and 1-octene). VLDPE is most commonly produced using metallocene catalysts due to the greater co-monomer incorporation exhibited by these catalysts The polymeric substrates for use as web-like polymeric substrate in the present invention are preferably selected from the group consisting of LLDPE, LDPE and VLDPE. Most preferably the polymeric substrate for use as web-like polymeric substrate in the present invention is LDPE.

The thickness of the polymeric substrate depends on the specific application. For plastic bags, preferably a thickness between 30 and 200 μm, more preferably between 50 and 100 μm and most preferably between 60 to 80 μm is used.

Sometimes, a primer layer is applied to the polymeric substrate for creating a specific effect such as a glossy or a mat finish. As long as the dry thickness is less than 5 μm, preferably less than 3 μm, these primers have no influence on the invention. The primer can be applied beforehand, for example, as a continuous layer by coating or flexographic printing. In a preferred embodiment, the primer is then a non-aqueous radiation curable liquid.

The present disclosure (the printing method) with said polymeric substrate as substrate web (100) may also be part of manufacturing decorative plastic bags.

Edge Bending

In a preferred embodiment the printer (200) comprises for forming each elongated strip (101, 102) a separate edge bender unit (203, 204).

Each edge bender unit (203, 204) is preferably used after the unwinding of the substrate web (100) and before applying said substrate web (100) on the support zone (201) of the printer (200).

In a preferred embodiment the inkjet printing method comprises a step for controlling the width of one of the pair of elongated strips (101, 102) for example by:

moving an edge bender unit of said pair of edge bender units (203, 204) across the continuous substrate web for controlling the width of one of the pair of elongated strips (101, 102). The position of the edge bender may hereby also be adapted according to the width of the substrate web. The printer (200) is configured to make this moving possible. Thus it may be a gantry attached to said printer (200) which is positioned across the continuous substrate web whereon both edge bender units (203, 204) are movable attached for example along a rail in said gantry.

An edge bender unit (203, 204) preferably comprises a staggered pair of sliding means (2031, 2041, 2032, 2042) for bending the continuous substrate web (100) between said staggered pair of sliding means (2031, 2041, 2032, 2042) which comprises a support sliding means (2031, 2041) for supporting said substrate web (100) and a bending sliding means (2032, 2042) for applying a pressure towards said substrate web (100) along said support sliding means (2032, 2042). The sliding means (2031, 2041, 2032, 2042) in the edge bender unit (203, 204) are preferably rolls, more preferably rotatable rolls which are rotating while passing the edge of the substrate web (100) through the edge bender unit (203, 204). This minimizes damage on the surface of the substrate web (100).

Figures from 7 until 11 illustrates such a preferred edge bender unit.

In a preferred embodiment the inkjet printing method comprises step(s) for controlling the bending angle at the one of the pair of elongated strips (101, 102) by the edge bender unit:

moving the bending sliding means (2032, 2042) towards the substrate web (100) along the support sliding means (2032, 2042) in a direction; and/or moving said bending sliding means (2032, 2042) towards said support sliding means (2032, 2042) in another direction.

With a handle (20321) as shown in the Figures from 7 until 11 the bending sliding means (2023) can be moved towards the substrate web (100). This is shown as a white arrow. Here also the edge bender unit (203) may move along a rail or gantry as shown by the long black arrow.

Flattening

In a preferred embodiment the inkjet printing method comprises an additional step:

c) flattening the printed substrate web towards the support zone (201) by spreading the pair of elongated strips (101, 102).

In another preferred embodiment of the inkjet printing method step b) comprises the step:

flattening the supported substrate web towards the support zone (201) by spreading the pair of elongated strips (101, 102).

Spreading of the elongated strips (101, 102) means in the present invention that the bend angle is enlarged back to substantially 180 degrees.

Thus after the bending of the substrate web, the substrate web is again flattened. Step c) may be performed by (heat-) rubbing the elongated strips (101, 102) and/or by (heat-) pressing the elongated strips (101, 102) especially at the pair of lines (1010, 1020). For the flattening-step in step b) still the pair of lines (1010, 1020) have to be remaining for giving said higher stiffness in the substrate web (100) for example by a soft touch, rub or pressing so the elongated strips (101, 102) still behave like a pair of flanges whereon the substrate web is supported.

Preferably for spreading the pair of elongated strips (101, 102) towards the support zone (201) vacuum is applied. It is found that the elongated strips (101, 102) behave like a seal whereby the vacuum is applied more efficient on the support zone (201), also called the vacuum zone especially when said applied vacuum is also used for holding down the supported flattened substrate web towards said zone (201) during the step of printing. Most preferably said support zone (201) is a vacuum zone of a vacuum belt of a printer (200) for transporting the substrate web (100) underneath an inkjet-printhead (202) of said printer (200). From said vacuum zone said vacuum is then applied. It is found that the by applying said elongated strips (101, 102); supporting the substrate web (100) on the vacuum zone whereby the elongated strips (101, 102) are oriented to said zone; and applying vacuum to hold down the whole media inclusive the elongated strips whereby the elongated strips are spread, that the substrate media (100) hold downs better the substrate web (100) than without applying said elongated strips (101, 102), especially when the substrate web (100) has edge-waviness. Also no wrinkles occur during the transport of the substrate web (100). The elongated strips (101, 102) may also be printed for example for a control strip for controlling color and alignment for printing information of the image that is printed. But due to said flattening, if applied before printing, also a part of the image may be printed on said elongated strips (101, 102).

The support zone (201) is in a less preferred embodiment a vacuum zone of a vacuum table (253) of a printer (200). Said vacuum belt (250) or vacuum table (253) is hereby a supporting means of the printer (200) whereon the support zone (201) is located.

Printer

The printer (100) from the present disclosure is a digital printer wherein a non-contact printing technology is used with an inkjet-printhead (202). Said printer is also called inkjet printer.

For having a good image quality, a constant height between an inkjet-printhead (202) and ink-receiver, here a continuous substrate web (100), is needed. In the present disclosure said inkjet printer may be a multi pass inkjet printer (FIG. 14 and FIG. 15) but a single pass inkjet printer is preferred (FIG. 12 and FIG. 13). One of the big issues in inkjet printing is that ink-receiver may touch the inkjet-printhead (202) whereby the inkjet-printhead is broken or has non-jetting nozzles which have to be recuperated. If the height between an inkjet-print an inkjet-printhead and ink-receiver needs to be constant, the ink-receiver have to be flat or may not warp up or may not move upwards from the support zone (201).

Figures from 1 to 5 illustrates several configurations of preferred printers, wherein a substrate web (100) is applied on a support zone of the printer and wherein an edge (1011) is bended towards said support zone by an edge bender unit (203). Hereby an elongated strip (101) is formed along a line (1010). The substrate web (100) is unrolled from an input roll (111) and rolled after printing an image by an inkjet-printhead (202) on an output roll (112) or cutted in sheets as shown in FIG. 2 wherein the substrate web (100) is cutted by a cutter (285) and sheets are collected in an output tray (290).

Figure 2:
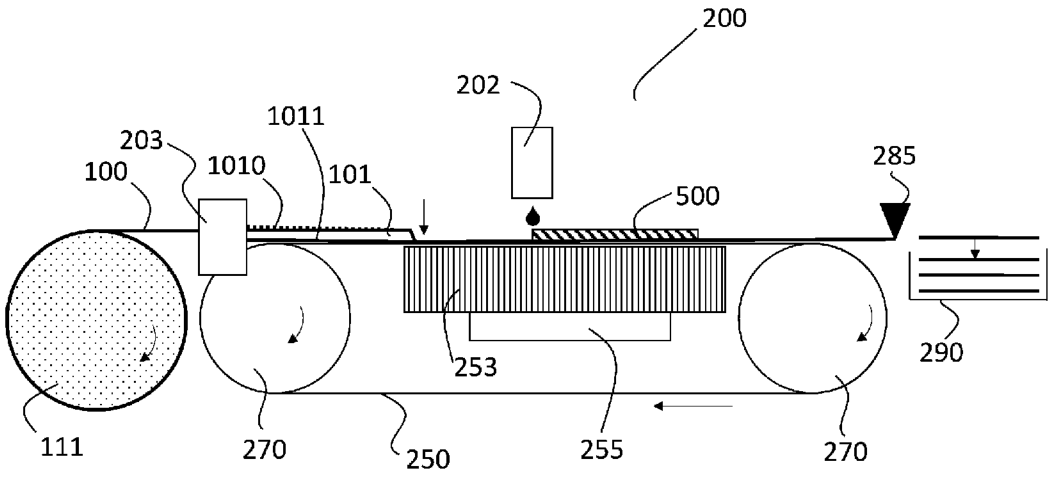

FIG. 1 and FIG. 2 illustrate each a printer (200) with a vacuum belt (250) which wraps two pulleys (270). The support zone has a vacuum zone which is formed by vacuum power from a vacuum chamber (255) via a vacuum table (253). Said vacuum power flattens the bended substrate web (100) towards the support zone as shown by the vertical black arrow. The arced black arrows show the movement of the different rolls in the printer (200).

Figure 3:
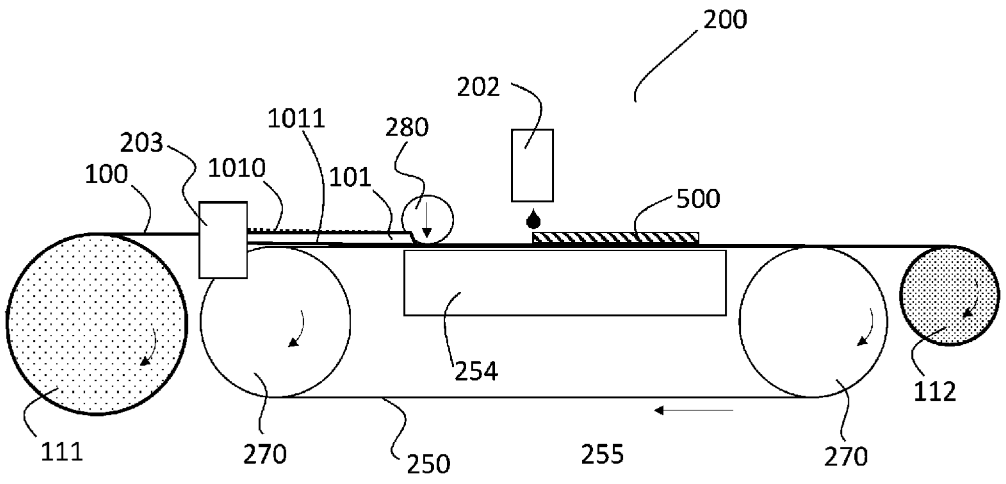

FIG. 3 illustrates a conveyor belt printer whereby the bended substrate web (100) is flattened by a flattener (280) before the image (500) is printed.

Figure 4:
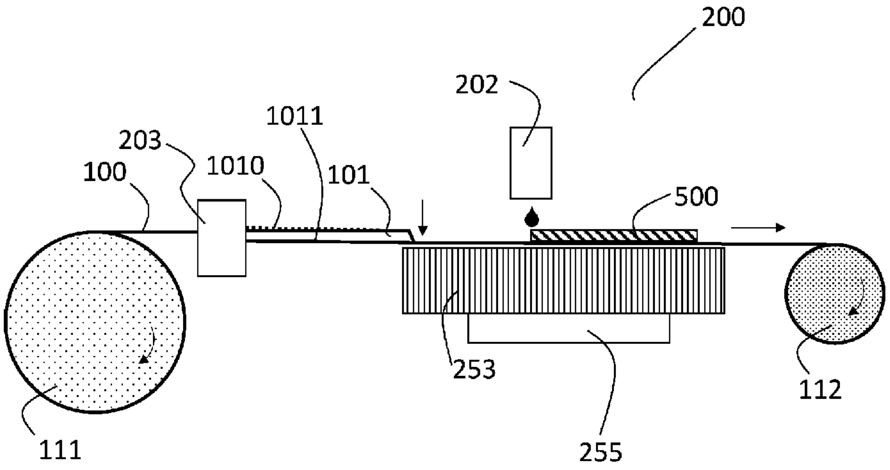

FIG. 4 illustrates a web printer whereby the substrate web (100) is conveyed over a vacuum table (253) which forms a support zone with vacuum power from a vacuum chamber (255). Said vacuum power flattens the bended substrate web (100) before printing.

The image is preferably printed with one or more pigmented inkjet inks which may be selected from aqueous pigmented inkjet inks, solvent based pigmented inkjet inks and radiation curable pigmented inkjet inks.

The one or more pigmented inkjet inks preferably contain organic colour pigments as they allow for obtaining a high colour gamut on the substrate web (100). Carbon black and titanium dioxide are inorganic pigments, which can be advantageously used in the present disclosure for composing black respectively white pigmented inkjet inks.

In a preferred embodiment, the one or more pigmented inkjet inks form a CMYK (W) or CRYK(W) inkjet ink set. The latest inkjet ink set is an advantage for printing wood colors, especially when manufacturing decorative surfaces.

Pigment particles in inkjet inks should be sufficiently small to permit free flow of the ink through the inkjet-printing device, especially at the ejecting nozzles. It is also desirable to use small particles for maximum colour strength and to slow down sedimentation. The numeric average pigment particle size of an organic colour pigment and an inorganic black pigment is preferably between 0.050 and 1 μm, more preferably between 0.070 and 0.300 μm and most preferably between 0.080 and 0.200 μm.

In a preferred embodiment the image is dried after or while printing the image on the continuous substrate web (100), said image is dried by a radiating device. The radiation may be performed by using a UV bulb lamp or a plurality of UV light emitting diodes or any type of IR-driers.

The printer may be performing the inkjet printing method on more than one continuous substrate web (100). An example of such a printer is disclosed in WO2019/170456 (AGFA NV) which may be part of manufacturing line for manufacturing decorative surfaces.

A preferred inkjet-printhead (202) for the printer (200) is a piezoelectric head. Piezoelectric inkjet printing is based on the movement of a piezoelectric ceramic transducer when a voltage is applied thereto. The application of a voltage changes the shape of the piezoelectric ceramic transducer in the inkjet-printhead (202) creating a void, which is then filled with inkjet ink or liquid. When the voltage is again removed, the ceramic expands to its original shape, ejecting a drop of ink from the inkjet-printhead.

A preferred piezoelectric printhead is a so called push mode type piezoelectric printhead, which has a rather large piezo-element capable of ejecting also high viscous inkjet ink droplets. Such an inkjet-printhead is available from RICOH™ as the GEN5s printhead.

A preferred piezoelectric printhead is a so-called through-flow piezoelectric drop-on-demand printhead. Such an inkjet-printhead is available from TOSHIBA TEC™, as the CF1ou printhead, and also from RICOH™ and XAAR™. Through-flow printheads are preferred in the present invention, because they enhance the reliability of inkjet printing.

When aqueous or solvent based inkjet inks are used, the printer (200) includes a drying device to evaporate the water and solvents from the ink jetted on the packaging material. Suitable dryers include devices circulating hot air, ovens, and devices using air suction.

The drying device may include an infrared radiation source. An effective infrared radiation source has an emission maximum between 0.8 and 1.5 μm. Such an infrared radiation source is sometimes called a NIR radiation source or NIR dryer. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

In a preferred embodiment, the NIR radiation source is in the form of NIR LEDs, which can be mounted easily on a shuttling system of a plurality of inkjet-printheads in a multi pass inkjet printers. Another preferred drying device uses Carbon Infrared Radiation (CIR).

When UV curable pigmented inkjet inks are used, the printer (200) includes a UV curing device. The UV curing device emits UV radiation that is absorbed by the photoinitiator or photoinitiating system for polymerizing the polymerizable compounds of the core.

The UV curing device may include a high or low pressure mercury lamp, but preferably includes or consists of UV LEDs.

The UV curing device may be arranged in combination with the inkjet-printhead (202) of the printer (200), travelling therewith so that the curing radiation is applied very shortly after jetting. Preferably such curing means consists of one or more UV LEDs, because in such an arrangement it can be difficult to provide other types of curing means that are small enough to be connected to and travelling with the inkjet-printhead (202). Alternatively, a static fixed radiation source may be employed, e.g. a source of curing UV-light, connected to the radiation source by means of flexible radiation conductive means, such as a fibre optic bundle or an internally reflective flexible tube, or by an arrangement of mirrors preferably including a mirror upon the inkjet-printhead (202).

However, it is not necessary to have the UV light source connected to the inkjet-printhead (202). The source of UV radiation may, for example, also be an elongated radiation source extending transversely across the ink on the packaging material to be cured. It may be adjacent to the transverse path of the inkjet-printhead (202) so that subsequent rows of the decorative image formed by the inkjet-printhead (202) are passed, stepwise or continually, beneath that radiation source.

Any ultraviolet light (UV) source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm, more preferably 360 to 400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $N_2$ or $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

The support zone (201) is part of a support means of the printer (200) which is preferably a vacuum table and more preferably a vacuum belt. On said table or belt a vacuum zone is applied as support zone (201) for holding down ink-receiver with vacuum from a vacuum chamber (255) of the printer (200). For example, WO2016/071122 (AGFA GRAPHICS NV) discloses details of a printer with a vacuum belt (250).

Figure 5:
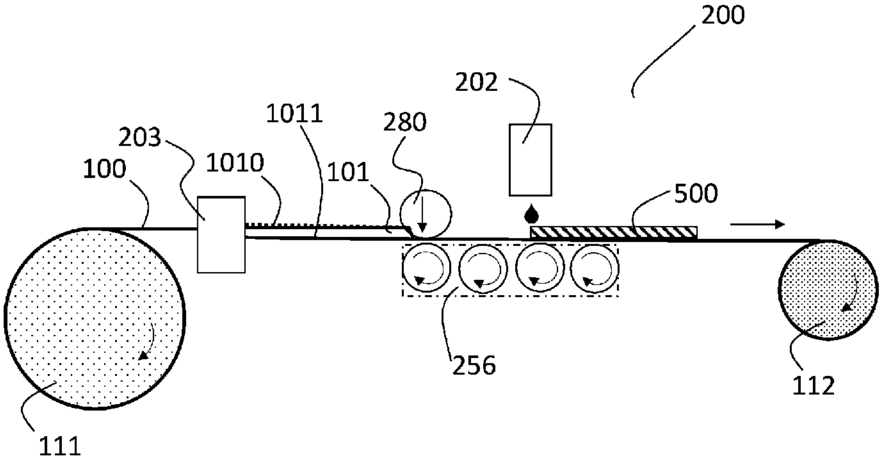

The support zone (201) may also be formed by a plurality of rolls where over the substrate web (100) is transported for printing as for example can be found in an Agfa Dotrix Modular by manufacturer AGFA NV and probably other single pass inkjet printers. An embodiment of a preferred printer with said plurality of rolls (256) is shown in FIG. 5.

Manufacturing Decorative Surfaces

The inkjet printing method of the present disclosure and all its preferred embodiments are preferably for manufacturing a decorative surface

- wherein the continuous substrate web (100) is a paper substrate which has a weight less than 150 g/$m^2$ and the image is printed with one or more aqueous pigmented inkjet inks; or
- wherein the continuous substrate web (100) is a thermoplastic substrate which has a weight less than 150 g/$m^2$ and which is based on a material selected from the group consisting of polyvinylchloride (PVC), polypropylene (PP), polyethylene (PE), polyethylene-terephthalate (PET) and thermoplastic polyurethane (TPU) and combinations thereof and the image is printed with one or more UV curable inkjet inks.

Said latest type of continuous substrate web is for example ideal for manufacturing luxury vinyl tiles (LVT). WO2018060189 (AGFA NV) discloses said manufacturing method.

Further, said one or more aqueous pigmented inkjet inks are preferably jetted before or after impregnation of the substrate web (100) with a thermosetting resin.

The printer (200) of the present disclosure is hereby preferably part of a manufacturing line for manufacturing decorative surfaces.

The inkjet printing method preferably comprises the step:

applying before step a) on the paper substrate at least one ink-receiving layer containing a polyvinylalcohol polymer and an inorganic pigment, wherein more preferably an outermost ink-receiving layer contains no inorganic pigment or contains a smaller content of inorganic pigment than an ink-receiving layer between the paper substrate and the outermost ink-receiving layer.

The use of the edge bender (203, 204) in a manufacturing line for manufacturing decorative surfaces is also an embodiment of the present disclosure, especially the edge bender with the staggered pair of sliding means (2031, 2041, 2032, 2042) as described under chapter 'Edge bending'.

Manufacturing Decorative Panels

The printed paper substrate in the manufacturing decorative surfaces becomes preferably then a decorative layer of a decorative panel, as decorative surface, which is more preferably selected from the group consisting of flooring, kitchen, furniture and wall panels. Herein the printed continuous substrate web, whether or not cut in sheets, is applied on a core layer, such as a MDF-plate, and optional other layers, such as balancing layer, protective layer or a sound-absorbing layer where after the whole assembly of substrate webs and said one or more layers is heat pressed together.

For example, DPL process (Direct Pressure Laminate) is a known method for manufacturing of decorative panels.

The paper substrate has preferably a porosity according to Gurley's method (DIN 53120) between 8 and 20 seconds.

It is found that the pair of lines (1010, 1020) is not visible anymore in the manufactured decorative panel. Hereby the elongated strips (101, 102) may also be inkjet printed with a part of the image which makes that there is no waste of material of said substrate web (100).

In a preferred embodiment the elongated strips (101, 102) become part of a tongue and/or groove which is applied in the decorative panels which allow the decorative panels to be clicked into one another. The advantage thereof is an easy assembly requiring no glue. A shape of the tongue and groove necessary for obtaining a good mechanical join is well-known in the art of laminate flooring, as also exemplified in EP 2280130 A (FLOORING IND), WO 2004/053258 (FLOORING IND), US2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The image printed on the continuous substrate web (100) is preferably a wood pattern, having nerves. In a preferred embodiment nerves of a printed wood pattern are oriented substantially parallel to the pair of lines (1010, 1020).

Core Layers

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910

(UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

An embodiment of the present disclosure is a method of manufacturing decorative panels comprising the steps of:

printing a wood pattern on a paper substrate according to the inkjet printing method of the present disclosure and its preferred embodiments;

impregnating the printed paper substrate with a thermosetting resin;

heat pressing the thermosetting resin impregnated printed paper substrate between a core layer and a protective layer and cut into a decorative panel selected from the group consisting of flooring, kitchen, furniture and wall panels.

Thermosetting Resin

The thermosetting resin is preferably selected from the group consisting of melamine-formaldehyde based resins, ureum-formaldehyde based resins and phenol-formaldehyde based resins.

Other suitable resins for impregnating the paper are listed in of EP 2274485 A (HUELSTA).

Most preferably the thermosetting resin is a melamine-formaldehyde based resin, often simply referred to in the art as a 'melamine (based) resin'.

Manufacturing Decorative Corrugated Cardboard

The printed paper substrate in the manufacturing decorative surfaces becomes preferably a decorative facing of linerboard of a decorative corrugated cardboard, as decorative surface.

In the manufacturing of decorative corrugated cardboard, the printed continuous substrate web, whether or not cut in sheets, is glued on one or more fluted sheets of paperboard (corrugating medium).

Corrugated card board is a preferred packaging material as it is low cost and lightweight, but also has the benefit that corrugated cardboard boxes are stackable, making them easy to store and transport. Corrugated cardboard is a packaging material formed by gluing one or more fluted sheets of paperboard (corrugating medium) to one or more flat sheets (called facings) of linerboard. Its comes in four common types: (a) Single face: one fluted sheet glued to one facing (total two sheets). (b) Single wall: one fluted sheet sandwiched between two facings (total three sheets); also called double face or single ply. (c) Double wall: one single-face glued to one single wall so that two fluted sheets are alternatively sandwiched between three flat sheets (total five sheets); also called double cushion or double ply. (d) Triple wall: two single-face glued to one single wall so that three fluted sheets are alternatively sandwiched between four flat sheets (total seven sheets); also called triple ply.

The preferred corrugated cardboard in the present invention is single wall or double wall, more preferably single wall corrugated cardboard as this is sufficiently strong and easy to crease. Single face corrugated cardboard generally has insufficient strength to hold the merchandise articles, while triple wall cardboard is often more difficult to crease into a packaging box.

The paper used in corrugated card board, such as Kraft paper, has often a brownish colour. In a preferred embodiment of the manufacturing decorative corrugated cardboards the paper substrate as the continuous substrate web (100) has a white colour for enhancing the colour vibrancy of the inkjet inks printed thereon. The white background contributes to the customer experience as the customer regards this as a more luxurious product. Alternatively, the white background may be applied as a layer by coating or printing prior to inkjet printing the image.

An embodiment of the present invention is method of manufacturing decorative corrugated cardboards wherein the continuous substrate web (100) is the paper substrate; and wherein said method of manufacturing has an additional step for forming a decorative corrugated cardboard: gluing the printed paper substrate on a fluting sheet of paperboard.

The elongated strips (101, 102) may be spread again or even spread more, if already spread, after printing the image (500) and before gluing on said fluting sheet of paperboard. More preferably the elongated strips (101, 102) are flattened after printing the image (500) and before gluing on said fluting sheet of paperboard.

| Reference signs list | |
|---|---|
| 100 | substrate web |
| 101 | elongated strip |
| 102 | elongated strip |
| 1010 | line |
| 1020 | line |
| 1011 | edge of a substrate web |
| 1021 | edge of a substrate web |
| 200 | printer |
| 201 | support zone |
| 2011 | edge of a support zone |
| 2012 | edge of a support zone |
| 202 | inkjet-printhead |
| 2031 | support sliding means |
| 2041 | support sliding means |
| 2032 | bending sliding means |
| 2042 | bending sliding means |
| 203 | edge bender unit |
| 204 | edge bender unit |
| 500 | image |

The invention claimed is:

1. A method for manufacturing a decorative surface using an inkjet printing method on a continuous substrate web, having a pair of edges, the method comprising:

(a) forming a pair of elongated strips by bending said substrate web along a pair of lines wherein each line is parallel to the pair of edges;

(b) supporting said bent substrate web in a support zone of a printer wherein said pair of elongated strips are oriented towards said zone, and (c) printing an image on said supported substrate web by an inkjet-printhead of said printer, wherein said pair of elongated strips are flattened towards the support zone by spreading the pair of elongated strips with applied vacuum in the support zone, wherein the continuous substrate web is a paper substrate which has a weight less than 150 g/m$^2$ and the image is printed with one or more aqueous pigmented inkjet inks, and wherein the paper substrate has a porosity according to Gurley's method (DIN 53120) between 8 and 20 seconds and the method further comprises:

applying before step a) on the paper substrate at least one ink-receiving layer containing a polyvinylalcohol polymer and an inorganic pigment, wherein the image is printed with the one or more aqueous pigmented inkjet inks before or after impregnation with a thermosetting resin.

2. The method for manufacturing a decorative surface of claim 1, wherein the printing step is a single pass printing method.

3. A method of manufacturing decorative panels comprising the steps of:

printing a wood pattern on the paper substrate as claimed in claim 1:

impregnating the printed paper substrate with a thermosetting resin; and heat pressing the thermosetting resin impregnated printed paper substrate between a core layer and a protective layer and cut into a decorative panel selected from the group consisting of flooring, kitchen, furniture, and wall panels.

4. A method of manufacturing decorative corrugated cardboards comprising the method of claim 1, wherein the method of manufacturing has an additional step for forming a decorative corrugated cardboard including:

gluing the printed paper substrate on a fluting sheet of paperboard.

5. The method for manufacturing a decorative surface of claim 1, wherein the pair of elongated strips are formed by a pair of edge bender units of the printer, each having staggered pair of sliding means, and wherein the continuous substrate web is bent between said staggered pair of sliding means which is a support sliding means for supporting said substrate web and a bending sliding means for applying a pressure towards said substrate web along said support sliding means.

6. The method for manufacturing a decorative surface of claim 5, further comprising a step for controlling the width of one of the pair of elongated strips including:

moving an edge bender unit of said pair of edge bender units across the continuous substrate web for controlling the width of one of the pair of elongated strips.

7. The method for manufacturing a decorative surface of claim 6, further comprising steps for controlling the bending angle at the one of the pair of elongated strips by the edge bender unit including:

moving the bending sliding means towards the substrate web along the support sliding means in a direction; and/or moving said bending sliding means towards said support sliding means in another direction.

8. The method for manufacturing a decorative surface of claim 1, wherein the smallest angle between the support zone and each elongated strip of the pair of elongated strips is below 80 degrees when the continuous substrate web is supported in said zone.

9. A method for manufacturing a decorative surface using an inkjet printing method on a continuous substrate web, having a pair of edges, the method comprising:

(a) forming a pair of elongated strips by bending said substrate web along a pair of lines wherein each line is parallel to the pair of edges;

(b) supporting said bent substrate web in a support zone of a printer wherein said pair of elongated strips are oriented towards said zone, and (c) printing an image on said supported substrate web by an inkjet-printhead of said printer, wherein said pair of elongated strips are flattened towards the support zone by spreading the pair of elongated strips with applied vacuum in the support zone, and wherein the continuous substrate web is a thermoplastic substrate which has a weight less than 150 g/m$^2$ and which is based on a material selected from the group consisting of polyvinylchloride (PVC), polypropylene (PP), polyethylene (PE), polyethylene-terephthalate (PET) and thermoplastic polyurethane (TPU) and combinations thereof and the image is printed with one or more UV curable inkjet inks.

10. The method for manufacturing a decorative surface of claim 9, wherein the printing step is a single pass printing method.

11. A method of manufacturing decorative panels comprising the steps of:

printing a wood pattern on the thermoplastic substrate as claimed in claim 9;

impregnating the printed thermoplastic substrate with a thermosetting resin; and heat pressing the thermosetting resin impregnated printed thermoplastic substrate between a core layer and a protective layer and cut into a decorative panel selected from the group consisting of flooring, kitchen, furniture, and wall panels.

12. The method for manufacturing a decorative surface of claim 8, wherein the width of each elongated strip of the pair of elongated strips is below 10 cm.

13. The method for manufacturing a decorative surface of claim 12, wherein the support zone is formed on a vacuum belt of the printer.

14. The method for manufacturing a decorative surface of claim 9, wherein the pair of elongated strips are formed by a pair of edge bender units of the printer, each having staggered pair of sliding means, and wherein the continuous substrate web is bent between said staggered pair of sliding means which is a support sliding means for supporting said substrate web and a bending sliding means for applying a pressure towards said substrate web along said support sliding means.

15. The method for manufacturing a decorative surface of claim 14, further comprising a step for controlling the width of one of the pair of elongated strips including: moving an edge bender unit of said pair of edge bender units across the continuous substrate web for controlling the width of one of the pair of elongated strips.

16. The method for manufacturing a decorative surface of claim 15, further comprising steps for controlling the bending angle at the one of the pair of elongated strips by the edge bender unit including:

moving the bending sliding means towards the substrate web along the support sliding means in a direction; and/or moving said bending sliding means towards said support sliding means in another direction.

17. The method for manufacturing a decorative surface of claim 9, wherein the smallest angle between the support zone and each elongated strip of the pair of elongated strips is below 80 degrees when the continuous substrate web is supported in said zone.

18. The method for manufacturing a decorative surface of claim 17, wherein the width of each elongated strip of the pair of elongated strips is below 10 cm.

19. The method for manufacturing a decorative surface of claim 18, wherein the support zone is formed on a vacuum belt of the printer.

* * * * *